US008245217B2

(12) United States Patent
Raman et al.

(10) Patent No.: US 8,245,217 B2
(45) Date of Patent: Aug. 14, 2012

(54) MANAGEMENT OF SOFTWARE AND OPERATING SYSTEM UPDATES REQUIRED FOR THE PROCESS OF CREATING A VIRTUAL MACHINE FACSIMILE OF AN EXISTING PHYSICAL OR VIRTUAL MACHINE

(75) Inventors: Venkatasubrahmanyan Raman, Seattle, WA (US); Natalya V. Varava, Bellevue, WA (US); Sergey Royt, Bellevue, WA (US); Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 11/871,628

(22) Filed: Oct. 12, 2007

(65) Prior Publication Data

US 2009/0100418 A1    Apr. 16, 2009

(51) Int. Cl.
*G06F 9/44*    (2006.01)
(52) U.S. Cl. .................................................. 717/170
(58) Field of Classification Search .................... 717/170
See application file for complete search history.

(56) References Cited

U.S. PATENT DOCUMENTS

| | | | | |
|---|---|---|---|---|
| 5,257,376 | A | 10/1993 | Beck et al. | 395/700 |
| 6,405,219 | B2 * | 6/2002 | Saether et al. | 709/219 |
| 6,981,250 | B1 * | 12/2005 | Wiltamuth et al. | 717/170 |
| 7,155,710 | B2 * | 12/2006 | Breckner et al. | 717/168 |
| 7,216,251 | B2 * | 5/2007 | Gaunt et al. | 714/6.11 |
| 7,216,343 | B2 * | 5/2007 | Das et al. | 717/168 |
| 7,246,351 | B2 * | 7/2007 | Bloch et al. | 717/168 |
| 7,484,223 | B2 * | 1/2009 | Hill et al. | 717/164 |
| 7,574,481 | B2 * | 8/2009 | Moore et al. | 717/168 |
| 2002/0188935 | A1 | 12/2002 | Hertling et al. | 717/170 |
| 2004/0064812 | A1 * | 4/2004 | Tachiyama | 717/170 |
| 2004/0172574 | A1 | 9/2004 | Wing et al. | 714/4 |
| 2005/0125513 | A1 | 6/2005 | Sin-Ling Lam et al. | 709/220 |
| 2005/0160418 | A1 | 7/2005 | Jeong et al. | |
| 2006/0010176 | A1 | 1/2006 | Armington | |
| 2006/0089995 | A1 * | 4/2006 | Kerr et al. | 709/227 |
| 2006/0155735 | A1 | 7/2006 | Traut et al. | 707/101 |

(Continued)

FOREIGN PATENT DOCUMENTS

WO    WO 2007/048062 A2    4/2007

OTHER PUBLICATIONS

Chen et al., "Update-Based Cache Access and Replacement in Wireless Data Access", IEEE, Dec. 2006.*

(Continued)

*Primary Examiner* — Wei Zhen
*Assistant Examiner* — Junchun Wu
(74) *Attorney, Agent, or Firm* — Woodcock Washburn LLP

(57) ABSTRACT

Disclosed are techniques for using known update technologies to automatically identify the updates installed on a physical machine prior to facsimile creation, to locate the update packages from an update server, and to download them to the machine performing the facsimile creation. The use of update technologies enables precise identification of the updates that affect the defined set of files requiring replacement, and thus minimizes the number of updates that need to be downloaded. In addition, the desired set of replacement files are extracted and cached to allow for their reuse during subsequent facsimile creations using either the same or different physical or virtual machine as the source. Downloading the minimal set of updates and caching them for reuse eliminates the redundant downloads of updates and results in a shorter time for facsimile creation.

18 Claims, 3 Drawing Sheets

U.S. PATENT DOCUMENTS

| | | | |
|---|---|---|---|
| 2006/0184937 A1 | 8/2006 | Abels et al. ........................ 718/1 |
| 2006/0218544 A1* | 9/2006 | Chakraborty et al. ......... 717/168 |
| 2006/0225065 A1 | 10/2006 | Chandhok et al. ............ 717/168 |
| 2006/0294516 A1 | 12/2006 | Winner et al. |
| 2007/0006225 A1 | 1/2007 | McCalister et al. |
| 2007/0088762 A1 | 4/2007 | Harris et al. .................. 707/201 |
| 2007/0169025 A1* | 7/2007 | Moore et al. .................. 717/139 |
| 2007/0244700 A1* | 10/2007 | Kahn et al. .................... 704/235 |
| 2007/0261045 A1* | 11/2007 | Gujarathi et al. ............. 717/168 |
| 2009/0019436 A1* | 1/2009 | Hartz et al. ................... 717/178 |

OTHER PUBLICATIONS

Machida et al., "Adaptive Monitoring for Virtual Machine Based Reconfigurable Enterprise Systems", IEEE, 2007.*

Chandra, R. et al., "The Collective: A Cache-Based System Management Architecture", NSDI, 2005, Technical Paper, http://www.usenix.org/event, 18 pages.

Yu, Y. et al., "A Feather-weight Virtual Machine for Windows Applications", *VEE*, 2006, 24-34, http://delivery.acm.org.

* cited by examiner

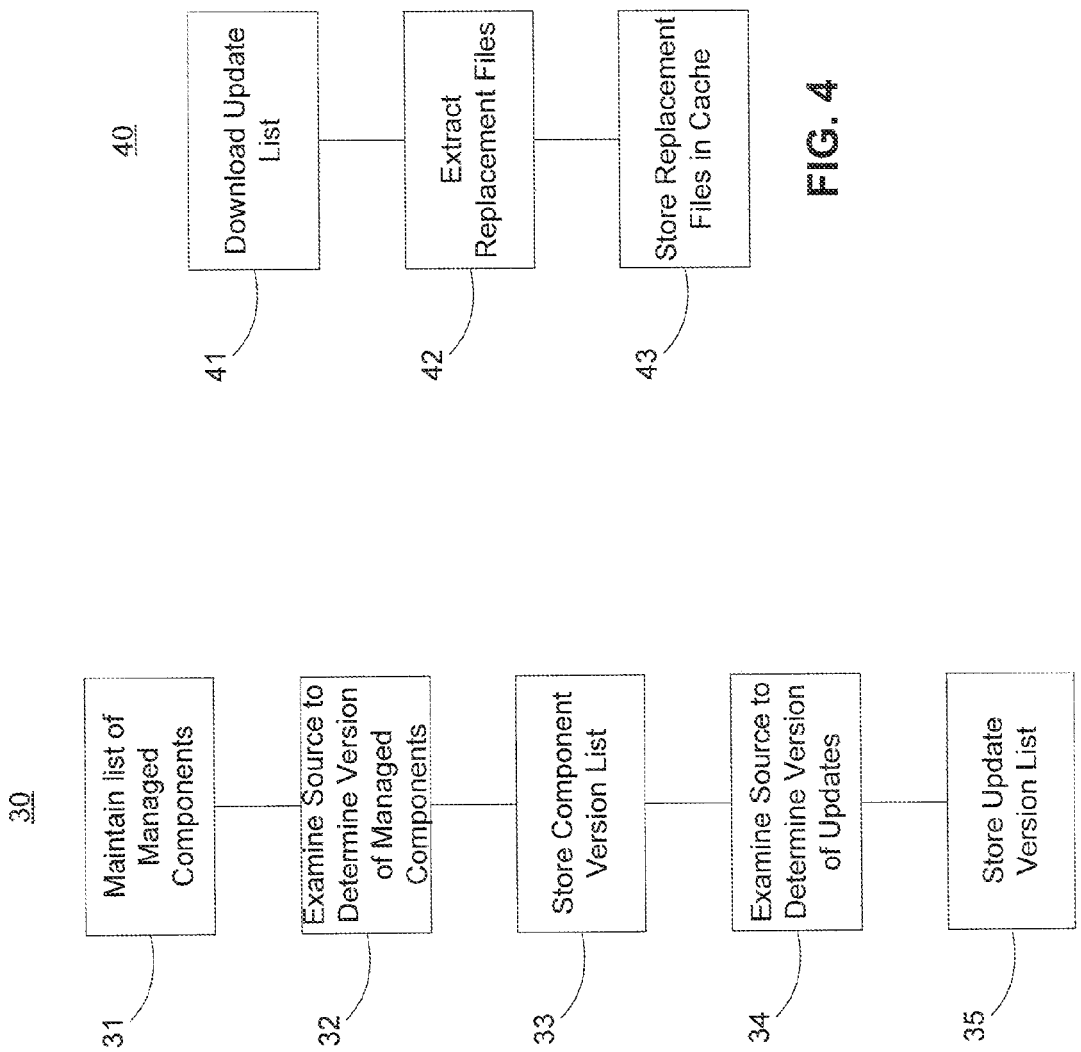

MANAGEMENT OF SOFTWARE AND OPERATING SYSTEM UPDATES REQUIRED FOR THE PROCESS OF CREATING A VIRTUAL MACHINE FACSIMILE OF AN EXISTING PHYSICAL OR VIRTUAL MACHINE

BACKGROUND

Physical and virtual machines over their lifetime have their operating systems and applications periodically upgraded by the installation of patches and updates. Examples of such patches and updates include, but are not limited to, service packs, hot fixes, fixes for security issues, and fixes for bugs in the installed versions of the software. Such updates sometimes affect the files in the defined set that need to be replaced during the creation of a virtual machine facsimile of the physical machine. Consequently, it may be critical to identify the updates that affected each file in the defined set of files in order to locate the correct version of the corresponding replacement file.

Once the relevant set of updates has been identified, the updates need to be downloaded from a repository of updates and examined to locate the replacement files. The appropriate replacement files need to be copied onto the virtual machine facsimile. Such a download and replacement process needs to be performed during every virtual machine facsimile creation.

Current solutions for the replacement problem typically address it using a manual process to identify and download the relevant updates, and by building customized scripts to find and replace the affected files in the facsimile. Such a process requires a trial and error approach, as well as user intervention, to keep the scripts current as new updates are released for the operating system and the applications. This can be a tedious and repetitive task as new updates may be released frequently. Changing the replacement scripts often imposes an additional test burden to ensure that they continue to operate correctly.

SUMMARY

Existing update technologies may be employed to automatically identify the updates installed on a physical machine prior to facsimile creation, to locate the update packages from an update server, and to download them to the machine performing the facsimile creation. The use of such update technologies enables precise identification of the updates that affect the defined set of files requiring replacement, and thus may minimize the number of updates that need to be downloaded. Additionally, the desired set of replacement files may be extracted and cached to allow for their reuse during subsequent facsimile creations using either the same or a different physical or virtual machine as the source. Downloading a minimal set of updates and caching them for reuse may eliminate redundant downloads of updates and may result in a shorter time for facsimile creation.

BRIEF DESCRIPTION OF THE DRAWINGS

FIG. 3 is a flowchart of a process for using update technologies to determine whether the updates or patches installed on a source machine need to be replaced during facsimile creation.

FIG. 4 is a flowchart of a process for storing extracted replacement files in a cache to be reused during future facsimile creation.

DETAILED DESCRIPTION

Figure 1:
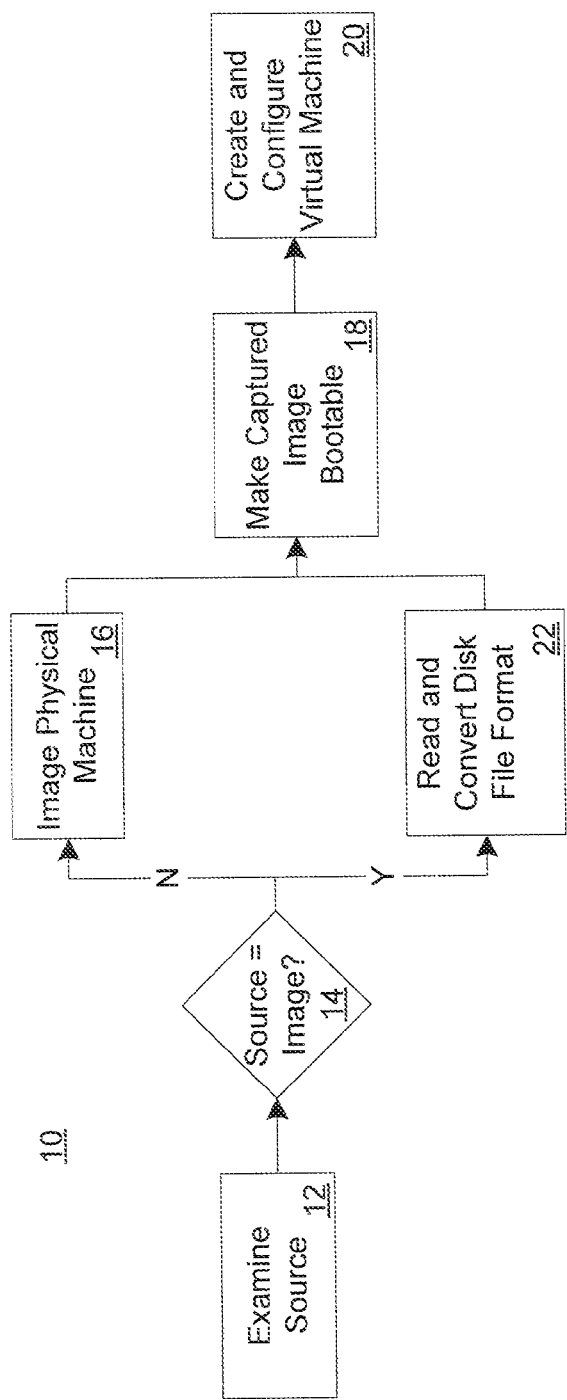
FIG. 1 is a flowchart of a process for creating a virtual machine facsimile.

FIG. 1 is a flowchart of a process 10 for creating a virtual machine facsimile. A virtual machine facsimile may be created from a "source," which may be a physical machine, a virtual machine that is currently running, or a pre-existing image (e.g., a virtual machine that is not currently running or a backup of a machine).

At 12, the source may be examined to ascertain its hardware and software profiles. As used herein, the term "profile" may refer to a set of hardware and/or software characteristics. For example, the source may be examined to determine the version of the operating system installed on it, as well as the versions of any system or application software installed on it. The source may be examined to identify any software patches or updates that may have been installed. The source hardware may be examined to determine how much memory and processing power (a.k.a., "CPU") the source has, how many network cards it has, what networks it may be connected to, the number, types, and sizes of disks it has, etc.

If the source is a pre-existing image, then the source may be represented by files on a data storage medium, rather than a running machine. Accordingly, the virtual machine configuration may be examined to ascertain the hardware and software profiles.

If the source is a physical machine or a virtual machine that is currently running, then the physical machine may be examined to ascertain its hardware and software profiles. As part of examining the source, at 12, update technologies may be employed to detect updates that may be currently installed on the physical or virtual machine for which the facsimile is being created. As used herein, the term "updates" includes software patches. The term "update technologies" refers to the use of an "update manager" for version control of certain "managed" software components.

Figure 2:
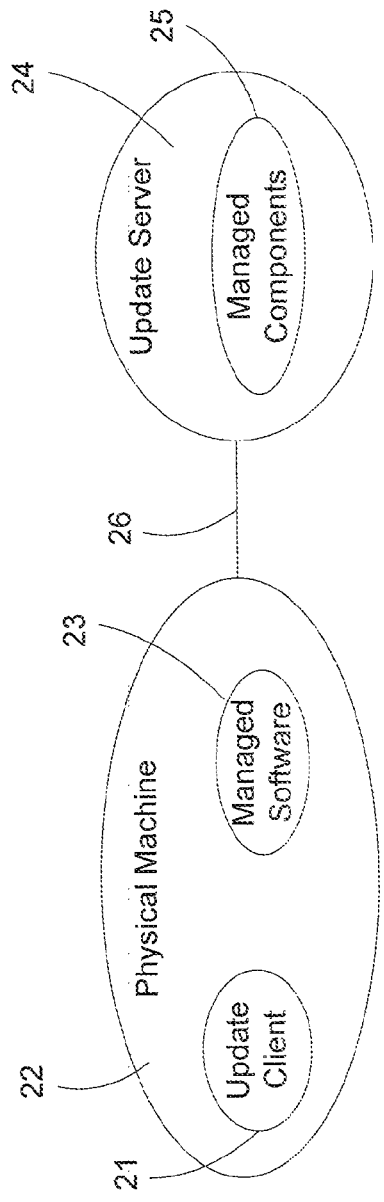
FIG. 2 depicts an example update manager system.

FIG. 2 depicts an example update manager system 20. The update client 21 accesses the machine 22 that includes the managed software 23, i.e., the software the version of which the update manager 20 endeavors to keep current. Typically, the update client 21 will reside and run on the machine 22 on which the managed software 23 is installed.

The update server 24 keeps track of the most current versions of any number of managed software components 25. The update server 24 is typically remote from the machine 22 on which the managed software 23 resides (i.e., the client machine). The update server 24 and the client machine 22 are typically interconnected via a network 26, such as the Internet. Examples of such an update server may include a Windows Update Server (WSUS) or a Microsoft Systems Management Server (SMS).

FIG. 3 depicts a method 30 for using update technologies to detect updates as part of examining a source (at 12 in FIG. 1). As shown in FIG. 3, an update client may be employed to examine the source to determine which versions of certain managed components the source includes. So that it may "know" which components are managed components, the update client may, at 31, maintain a list of managed components. Any or all of the software components residing on a source may be managed components.

At 32, the update client may examine the source to determine which version of each managed component the source currently includes. At 33, the update client may store (e.g., in memory on the source machine) the list of managed components and a version associated with each.

At 34, the update client may examine the source to determine whether any updates have been applied to any of the managed components. If so, at 35, the update client may store an update identifier (e.g., version number) associated with the update and the managed component to which the update was applied.

Thus, an update client may be employed to examine the source to identify the most-current versions of certain managed software components installed on the source, including the most-current versions of any updates (including patches) that may be installed on the source. As will be described below, the use of update technologies to identify the updates currently installed on the source may reduce the number of files that need to be downloaded to make the captured image bootable.

Description of a process for creating a virtual machine facsimile now continues with reference once again to FIG. 1. After the source is examined at 12, the source may be "imaged." How the source is imaged may depend on whether the source, itself, is an image. An "image" may be considered a set of files that replicate the contents (e.g., the hardware and software profiles) of a physical machine.

If, at 14, it is determined that the source is an image, then, at 22, the source may be imaged by reading the set of files that form the image, and converting the format of any such files, if necessary, to generate a set of files in a desired file format.

If, at 14, it is determined that the source is not merely an image, and, therefore that the source is either a physical machine or a virtual machine that is currently running, then, at 16, the physical machine may be imaged. In this case, where the machine to be imaged is a virtual machine that is currently running, the term "physical machine to be imaged" may refer to the physical machine that the virtual machine emulates. Techniques for imaging a physical machine are well-known. Examples of such techniques are described and claimed in U.S. patent application Ser. No. 11/430,676, filed May 8, 2006, the disclosure of which is hereby incorporated herein by reference.

At 18, the captured image may be made "bootable." That is, the image captured at 14 or 22 may be made compatible with the configuration emulated by the virtual server software that will be used to "run" the facsimile.

FIG. 4 is a flowchart of an example process 40 for making a captured image bootable. At 41, the minimal list of updates (identified at 12 in FIG. 1) may be downloaded from the update server to the machine performing the facsimile creation process. Update technologies may be used to query, locate, and download the list of updates.

The updates may be examined, at 42, to extract appropriate replacement files for each of the files that need to be replaced or added. These files may then be used to perform the replacement and render the virtual machine facsimile operational. It should be understood, of course, that existing files may be replaced, or new files added/installed (e.g., drivers for emulated devices). At 43, the extracted replacement files may be stored in a cache on the machine performing the facsimile creation process to be reused during future facsimile creation. This is an optimization that tends to ensure that each update is downloaded only once. Once all the required updates have been added to the cache, future facsimile creations can proceed without requiring any downloads.

With reference again to FIG. 1, the virtual machine may be created and configured at 20. That is, the hard disks defined by the file set that forms the captured image may be logically assembled to form the virtual machine. The hard disks may be logically connected to one another, and the virtual machine may be started running. Thus, software and operating system update technologies may be employed for the process of creating a virtual machine facsimile of an existing physical or virtual machine.

Exemplary Computing Arrangement

Figure 5:
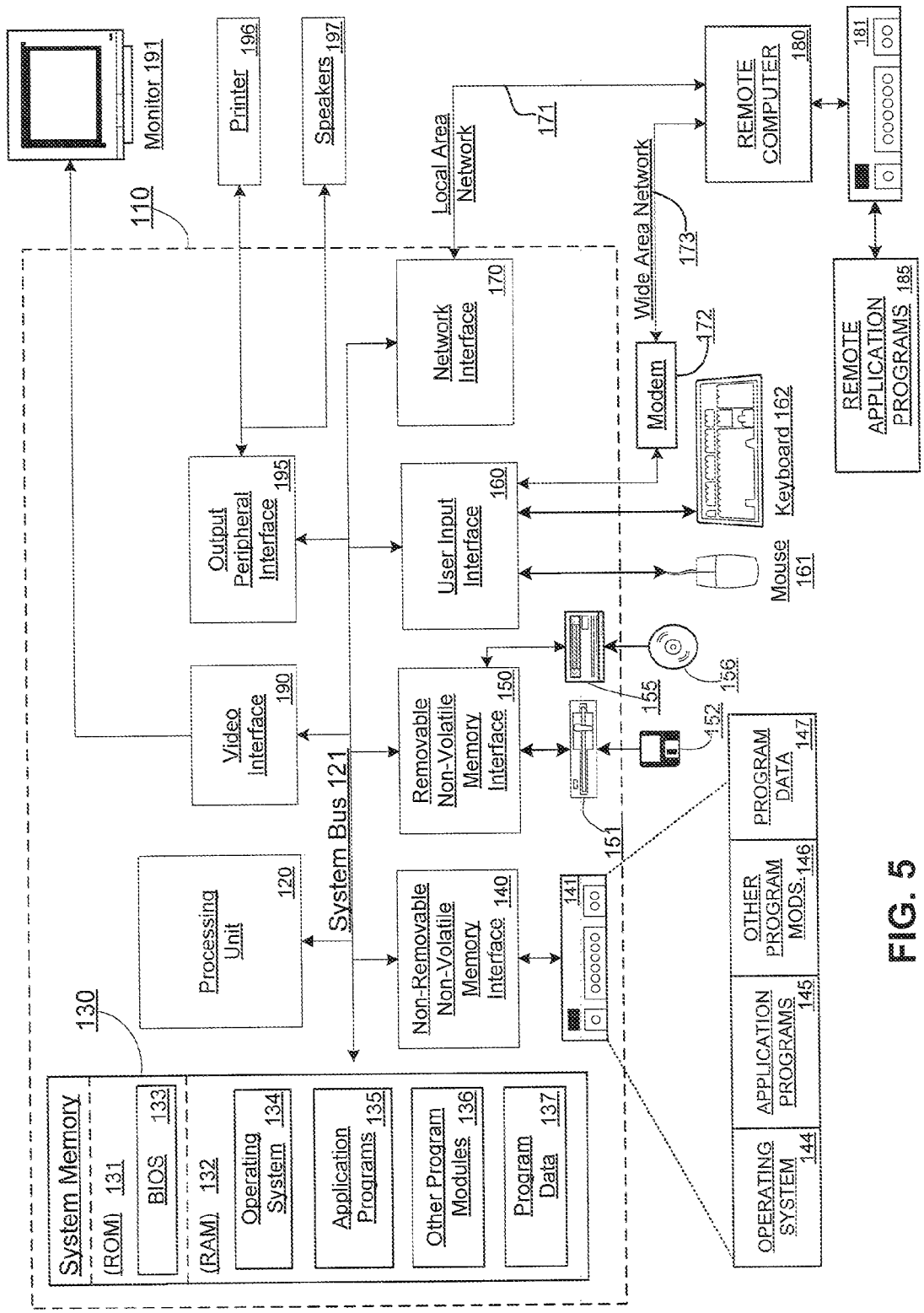
FIG. 5 is a block diagram of an example computing environment in which example embodiments and aspects may be implemented.

FIG. 5 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for creating a virtual facsimile of a source machine, the method comprising:

examining the source machine to ascertain a set of software characteristics associated with the source machine, wherein the set of software characteristics includes an identity of a software component installed on the source machine;

determining an installed version of the software component, wherein the installed version of the software component is currently installed on the source machine;

determining, from an update server, whether the installed version of the software component is a most current version of the software component;

forming an image of the source machine that includes the most current version of the software component;

identifying an update to the software component, wherein the update is currently installed on the source machine;

determining an installed version of the update, wherein the installed version of the update is currently installed on the source machine;

determining, from the update server, whether the installed version of the update is a most current version of the update; and including the most current version of the update in the image of the source machine, the including the most current version of the update comprising: examining a first set of files to determine whether any of the files in the first set is affected by the update, the first set of files forming a software profile of the source machine; and forming a second set of files that includes at least one replacement file, the replacement file corresponding to a file from the first set that was affected by the update.

2. The method of claim 1, further comprising making the image of the source machine bootable on a physical machine.

3. The method of claim 2, further comprising creating a virtual machine on the physical machine.

4. The method of claim 3, wherein creating the virtual machine comprises assembling a plurality of virtual hard disks, wherein each of the virtual hard disks is defined by a respective set of files, and at least one of the hard disks is defined by at least one file associated with the most current version of the software component.

5. The method of claim 4, wherein assembling the hard disks comprises logically interconnecting the files that form the virtual hard disks.

6. The method of claim 3, further comprising running the virtual machine on the physical machine.

7. The method of claim 1, further comprising downloading the replacement file from an update server.

8. The method of claim 7, further comprising:
storing the downloaded replacement file in a cache;
retrieving the stored replacement file from the cache; and
forming a second image of the physical machine that includes the replacement file retrieved from the cache.

9. A computer readable storage medium having stored thereon instructions that when executed by a processor cause the processor to create a virtual facsimile of a source machine, the instructions comprising:
instructions to provide an identity of a software component installed on the source machine;
instructions to identify an update to the software component, wherein the update is currently installed on the source machine;
instructions to determine an installed version of the update by examining the source machine, wherein the installed version of the update is currently installed on the source machine;
instructions to determine, from the update server, whether the installed version of the update is a most current version of the update;
instructions to form an image of a source machine that includes the most current version of the update;
instructions to determine, from the update server, whether the installed version of the update is a most current version of the update; and including the most current version of the update in the image of the source machine; including the most current version of the update comprising: examiner a first set of files to determine whether an of the files in the first set is affected by the update, the first set of files forming a software profile of the source machine; and forming a second set of files that includes at least one replacement file, the replacement file corresponding to a file from the first set that was affected by the update.

10. The computer readable storage medium of claim 9, further comprising:
providing a first set of files that form a software profile of the source machine;
examining the first set of files to determine whether any of the files in the first set is affected by the update;
forming a second set of files that includes at least one replacement file, the replacement file corresponding to a file from the first set that was affected by the update.

11. The computer readable storage medium of claim 9, further comprising making the image of the source machine bootable on a physical machine.

12. The computer readable storage medium of claim 11, further comprising creating a virtual machine on the physical machine.

13. The computer readable storage medium method of claim 12, wherein creating the virtual machine comprises assembling a plurality of virtual hard disks, wherein each of the virtual hard disks is defined by a respective set of files, and at least one of the hard disks is defined by at least one file associated with the most current version of the software component.

14. The computer readable storage medium of claim 13, wherein assembling the hard disks comprises logically interconnecting the files that form the virtual hard disks.

15. The computer readable storage medium of claim 12, further comprising running the virtual machine on the physical machine.

16. A method for creating a virtual facsimile of a source machine, the method comprising:
downloading a from an update server a software update associated with a software component, wherein the software component is included in a software profile of the source machine;
forming a first image of the source machine, wherein the software update forms part of a first image of the source machine;
storing the software update in a cache;
retrieving the software update from the cache; and
forming a second image of the source machine, forming the second image of the source machine comprising: examining a first set of files to determine whether any of the files in the first set is affected by the software update, the first set of files forming a software profile of the source machine; and forming a second set of files that includes at least one replacement file, the replacement file corresponding to a file from the first set that was affected by the software update.

17. The method of claim 16, further comprising making the file retrieved from the cache bootable on a physical machine.

18. The method of claim 17, further comprising running a virtual machine on the physical machine, wherein running the virtual machine comprises executing the file retrieved from the cache.

* * * * *